(12) United States Patent
Tong

(10) Patent No.: US 7,058,312 B2
(45) Date of Patent: Jun. 6, 2006

(54) OPTO-ELECTRONIC PHASE-LOCKED LOOP WITH MICROWAVE MIXING FOR CLOCK RECOVERY

(75) Inventor: Dennis Tong, Middletown, NJ (US)

(73) Assignee: Agere Systems Inc., Allentown, PA (US)

( * ) Notice: Subject to any disclaimer, the term of this patent is extended or adjusted under 35 U.S.C. 154(b) by 673 days.

(21) Appl. No.: 10/015,477

(22) Filed: Dec. 13, 2001

(65) Prior Publication Data

US 2002/0181041 A1   Dec. 5, 2002

Related U.S. Application Data

(60) Provisional application No. 60/294,693, filed on May 31, 2001.

(51) Int. Cl.
*H04B 10/00* (2006.01)
(52) U.S. Cl. ..................................... 398/155; 398/154
(58) Field of Classification Search ................ 398/154, 398/155, 180, 181
See application file for complete search history.

(56) References Cited

U.S. PATENT DOCUMENTS

| | | | |
|---|---|---|---|
| 5,590,143 A | 12/1996 | Takara et al. | |
| 5,594,583 A | 1/1997 | Devaux | |
| 5,774,246 A | 6/1998 | Bulow | |
| 5,894,247 A | 4/1999 | Yoshida et al. | |
| 5,987,040 A | 11/1999 | Nesset et al. | |
| 6,178,022 B1 | 1/2001 | Yoneyama | |

OTHER PUBLICATIONS

D.T.K. Tong, Kung-Li Deng, B. Mikkelsen, G. Raybon, K.F. Dreyer and J.E. Johnson, "160 Gbit/s clock recovery using electroabsorption modulator-based phased-locked loop", Electronic Letters 9$^{th}$ Nov. 2000, vol. 36 No. 23.*

Tong, Dennis T.K et al., Optoelectronic "Phase-Locked Loop with Balanced Photodetection for Clock Recovery in High-Speed Optical Time-Division-Multiplexed Systems," IEEE Photonics Technology Letters, vol. 12, No. 8, Aug. 2000, pp. 1064-1066.

Tong, Dennis T.K et al., "High Speed Clock Recovery Using an Optoelectronic Phase Locked Loop Implemented with Balanced Photodetection," 1999 IEEE LEOS 12$^{th}$ Annual Meeting Conference Proceedings, Nov. 1999, vol. 1, pp. 349-350.

* cited by examiner

Primary Examiner—David C. Payne

(57) ABSTRACT

A clock recovery circuit for synchronizing a clock signal having frequency of approximately f0 with an optical data signal having a frequency of N×f0, where N is an arbitrary rational number, includes a local oscillator for generating the clock signal, a sampler for producing an output signal indicative of a phase difference between the clock signal and the optical data signal, an optical detector coupled to detect the output signal as an electrical signal, and a mixer for isolating at least one harmonic of the electrical signal and for downconverting the at least one harmonic to a baseband error signal. The local oscillator is tuned in response to the baseband error signal to synchronize the clock signal with the optical data signal.

24 Claims, 5 Drawing Sheets

OPTO-ELECTRONIC PHASE-LOCKED LOOP WITH MICROWAVE MIXING FOR CLOCK RECOVERY

CROSS-REFERENCE TO RELATED APPLICATIONS

This application claims priority from U.S. provisional application Ser. No. 60/294,693, filed May 31, 2001, to Dennis Tak Tong, entitled "Clock Recovery Using Electroabsorption Modulator-Based Phase Locked Loop," the entirety of which is hereby incorporated herein by reference.

FIELD OF THE INVENTION

The present invention relates to clock recovery circuits and methods, and more particularly to clock recovery circuits and methods in high-speed optical communication systems.

DESCRIPTION OF THE RELATED ART

Optical time division multiplexing (OTDM) is an attractive technique for increasing optical fiber transmission capacity beyond the limits set by the bandwidth of the transmitter and receiver electronics. With OTDM techniques, a high line rate multiplexed signal is generally realized by bit interleaving a natural number N of lower data rate signals each having a tributary data rate f0. The OTDM signal has a data rate of N×f0. In transmission systems utilizing OTDM techniques, clock recovery at the tributary data rate from the OTDM data stream is of immense importance for synchronizing processes such as demultiplexing and retiming, reshaping and regeneration of component data signals (i.e., 3R regeneration) at each node in the transmission system.

Phase locked loops (PLL) are the most established techniques for recovering clocks from high-speed data streams. As data rates progress past the 100 Gbit/s range, PLLs with optoelectronic phase detectors begin to provide a viable alternative to all-electrical systems, which become prohibitively expensive as data rates increase. A problem exists, however, with utilizing an optoelectronic phase detector in connection with a PLL. When an optical signal, such as an OTDM signal, is sampled by a voltage controlled oscillator (VCO) output to lock the phase of the VCO onto the input data, the difference signal detected at a photodetector includes both a desired phase error signal and an undesired DC offset proportional to the average optical power of the sampled data. While the error signal indicates the magnitude of the phase difference between the incoming data stream and the local clock signals of the PLL, the DC offset causes the well-known polarity ambiguity problem. Basically, it is impossible to determine whether the phase difference is positive or negative since the output of the photodetector of the PLL is always greater than or equal to zero, indicating the presence or absence of light, respectively. Generally, the DC offset makes detection of the polarity of the phase error difficult, if not impossible, and the ambiguity in the error signal can lead to inaccurate control of the VCO.

In prior optoelectronic-PLL circuits, a low frequency dither signal is incorporated to resolve the polarity ambiguity in the error signal that arises from the aforementioned DC offset. The addition of the dither signal, however, introduces extra system complexity and undesired frequency modulation in the recovered clock signal.

Therefore, there remains a need for a clock recovery circuit and method which effectively integrate optoelectronic phase detectors with phase-locked loop techniques while resolving the error signal polarity ambiguity problems typically associated with such circuits and without introducing complex additional circuitry. Still further, there remains a need for such a clock recovery circuit and approach which provides an easily scalable solution for use in future higher speed OTDM systems.

SUMMARY OF THE INVENTION

A clock recovery circuit, and method of clock recovery, are provided or synchronizing a clock signal having frequency of approximately f0 with an optical data signal having a frequency of N×f0, where N is an arbitrary rational number. The clock includes a local oscillator for generating the clock signal, a sampler for producing an output signal indicative of a phase difference between the clock signal and the optical data signal, an optical detector coupled to detect the output signal as an electrical signal, and a mixer for isolating at least one harmonic of the electrical signal and for downconverting the at least one harmonic to a baseband error signal. The local oscillator is tuned in response to the baseband error signal to synchronize the clock signal with the optical data signal.

The present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Although the clock recovery circuit and recovery method are described hereafter in connection with a 160 Gbit/s OTDM signal with a tributary rate of 10 GHz, it should be realized that this is for purposes of illustration only. The circuit and method described herein are in no manner limited to those data rates and indeed are scalable to accommodate a wide range of data rates while utilizing the same basic circuit approach.

Figure 1:
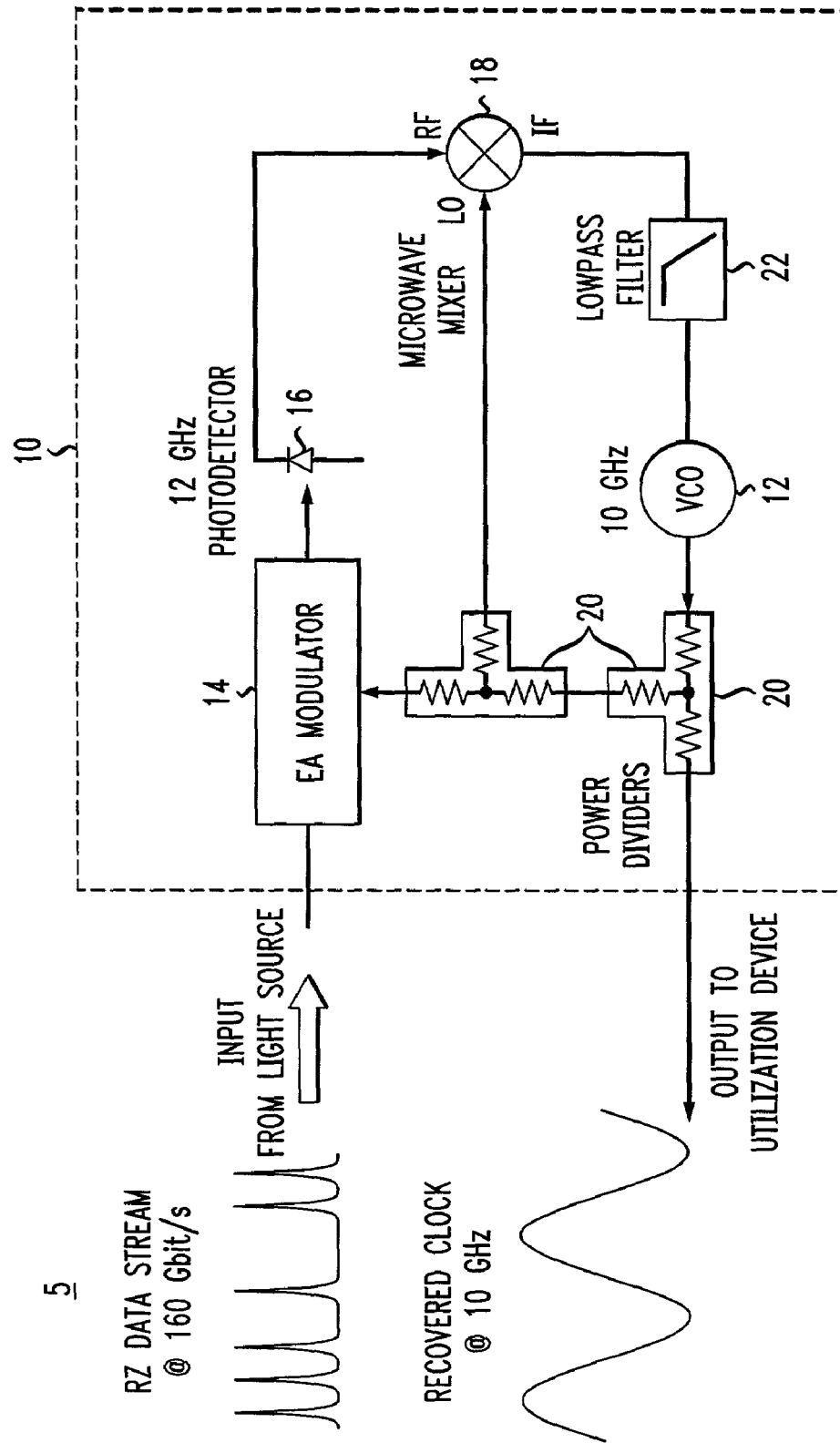
FIG. 1 is diagram of an optical transmission system including an exemplary clock recovery circuit that is illustrated by a circuit diagram.

Referring to FIG. 1, an optical transmission system 5 is shown including of a clock recovery circuit 10, illustrated by a circuit diagram. The clock recovery circuit 10 synchronizes a clock signal having a frequency of approximately f0 with an optical data signal from a light source. The optical data signal has a frequency of N×f0, where N is an arbitrary rational number, typically but not necessarily, a natural number. The synchronized clock signal can then be used by a utilization device for data regeneration applications, for example, as described in the "Description of the Related Art" section.

An incoming OTDM return-to-zero (RZ) data stream at 160 Gbit/s is sampled by an output signal from a local oscillator output, such as a voltage controlled oscillator (VCO) output, through a sampler, such as electroabsorption (EA) modulator circuit 14. Before locking, the VCO 12 runs at a preselected clock frequency at or around the expected tributary rate, such as at 10±0.001 GHz, with its phase to be locked onto that of the input data contained within the OTDM signal. Details of an exemplary EA modulator circuit 14 are described below in connection FIG. 2.

The data which is sampled by the EA modulator circuit 14 is directly detected as an electrical signal by an optical detector, such as through a 12 GHz photodetector 16. The EA modulator circuit 14 basically functions as an optoelectronic phase detector such that any phase difference between the input data and the VCOs output imposes a slow-varying modulation in the sampled output signal produced by the EA modulator circuit 14 and detected by the optical detector. In the RF spectrum, the mixing product between the VCO's output and the OTDM input data signal includes a phase error signal having phase error sidebands centered at DC and various clock frequency harmonics, i.e., 10 GHz, 20 GHz, 30 GHz, . . . and a DC offset proportional to the average optical power of the sampled data. The DC offset as described above can cause polarity ambiguity in the error signal which, in turn, can cause inaccurate tuning of the VCO of a PLL.

In an exemplary embodiment of the clock recovery circuit 10, the photodetector 16 has an operating speed which is close to that of the local oscillator 12, such as a speed between 10–12 GHz. In this manner, the first harmonic of the error signal at 10 GHz can be detected and further isolated and processed by the microwave mixer 18.

At least one harmonic of the electrical signal, preferably the phase error sidebands centered around 10 GHz, is extracted at a RF port of a microwave mixer 18. The RF port may, for example, have a bandwidth of approximately 8–12 GHz, thereby isolating the phase error sidebands centered at 10 GHz. These sidebands are mixed with the output signal from the VCO 12 through power dividers 20 to produce a sum and a difference product. The phase error sidebands centered at 10 GHz are essentially down-converted to a baseband error signal through the mixer 18, and due to the bandwidth of the mixer's RF port, the DC offset which arose from the average optical power of the sampled data is filtered out. Consequently, the polarity of the down-converted error signal is well defined, thereby clearly indicating whether the phase of the clock signal should be increased or decreased. If the DC offset were removed by a filter, as opposed to microwave mixer 18, then a portion of the error signal would be lost as well do to the finite bandwidth of the filter. The difference product can be extracted using a lowpass filter 22 and be used to tune VCO 12 in a manner known to those familiar with PLL circuitry. A recovered clock signal which has a frequency of approximately 10 GHz and which is synchronized with the input data signal is produced at an output of the clock recovery circuit 10 (as shown in FIG. 1) for use by a utilization device for a process such as data regeneration.

Figure 2:
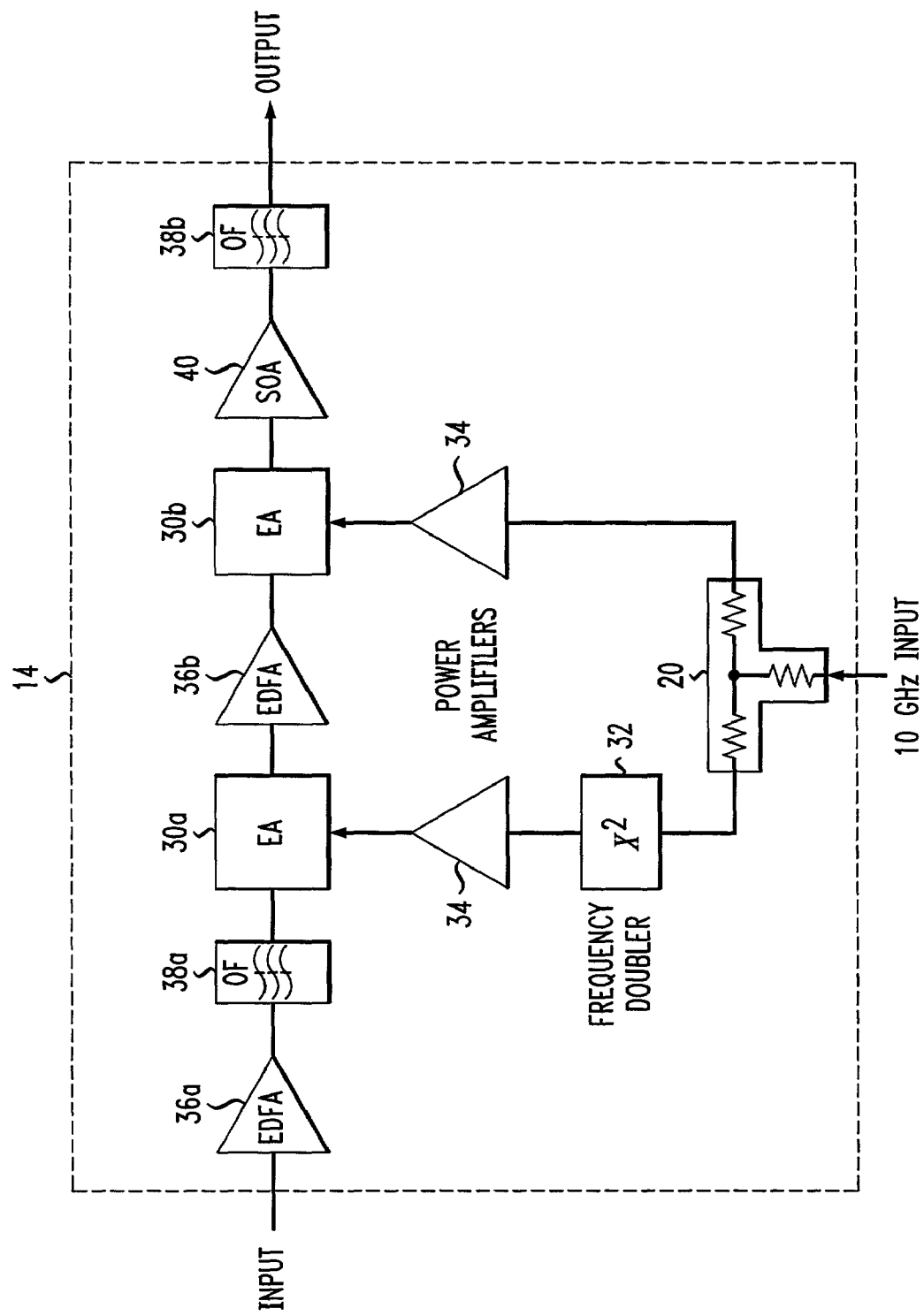
FIG. 2 is a circuit diagram of an exemplary electroabsorption modulator circuit for clock recovery from a high-speed optical time division multiplexed data signal.

Referring to FIG. 2, there is shown in more detail a circuit diagram of an exemplary electroabsorption modulator circuit 14 for sampling a 160 Gbit/s input data signal with a VCO. If one electroabsorption modulator cannot provide a sufficiently narrow gating window to resolve the high data rate of the optical data signal, two or more electroabsorption modulators can be utilized, a higher modulation frequency may be utilized, or both. Known EA modulators when driven under large sinusoidal voltages, such as 10–20 volts peak to peak, typically produce switching windows of 10 ps or less. The switching window may be reduced by concatenating two or more EA modulators at a lower cost, allowing for simplified upgrade for higher data rates. In order to generate an appropriate switching window in the electroabsorption modulator circuit 14 for sampling or resolving a 160 Gbit/s optical data stream, a pair of concatenated EA modulators 30*a* and 30*b* are utilized. An output signal of approximately 10 GHz from the VCO 12 is coupled to a power divider 20 to produce two 10 GHz signals. A first signal is coupled to a microwave frequency doubler 32 to produce an approximately 20 GHz signal. The first EA modulator 30*a* is then driven by the 20 GHz signal after amplification by a power amplifier 34. The second EA modulator 30*b* is driven by an approximately 10 GHz signal amplified by a power amplifier 34.

A number of amplifiers 34, 36 are optionally employed to make the output power of EA modulator circuit 14 less sensitive to the input power of the optical data signal. In this manner, the input dynamic range of the entire recovery circuit 10 is improved. The EA modulator circuit 14 may include an input amplifier, such as an erbium doped fiber amplifier (EDFA) 36*a*, for initially amplifying the input data signal. A second amplifier, such as EDFA 36*b* amplifies the intermediate output signal from EA modulator 30*a*. The second EA modulator 30*b* may also be monolithically integrated with a semiconductor optical amplifier (SOA) 40. Amplifier 40 may also be an erbium doped fiber amplifier. EDFA 36*b* and SOA 40 compensate for insertion losses which may arise from EA modulators 30*a*, 30*b*. The EA modulator circuit 14 may also include a pair of optical filters (OF) 38*a*, 38*b* for removing any noise introduced by the amplifiers 36*a*, 36*b*, 40. The entire clock recovery circuit may be monolithically integrated or hybridly integrated on a substrate, i.e., with discrete components connected on a single substrate.

A clock recovery circuit 10, as described above in connection with FIGS. 1 and 2, was tested for recovering a clock signal from a 160 Gbit/s OTDM signal. A 40 Gbit/s data stream having a word length of $2^{31}-1$ was encoded onto a continuous wave (CW) optical signal at 1553 nm using a Mach Zender LiNbO$_3$ modulator. The 40 Gbit/s non-return-to-zero (NRZ) data was converted to return-to-zero (RZ) format with a pulse width of 2.0 ps. The transform-limited 2.0 ps pulses were generated by a sinusoidally driven EA modulator at 40 GHz, followed by an optical 2R regenerator which performs reshaping and nonlinear optical pulse compression. The 40 Gbit/s RZ data was then time-multiplexed to 160 Gbit/s by bit-interleaving through two stages of optical fiber delay lines. To assure data decorrelation between adjacent channels, the delaying branches in both stages of the multiplexer included more than twenty meters of fiber. FIG. 3(*a*) shows the multiplexed 160 Gbit/s data stream as measured on a streak camera with a resolution of 4 ps.

Figure 3A:
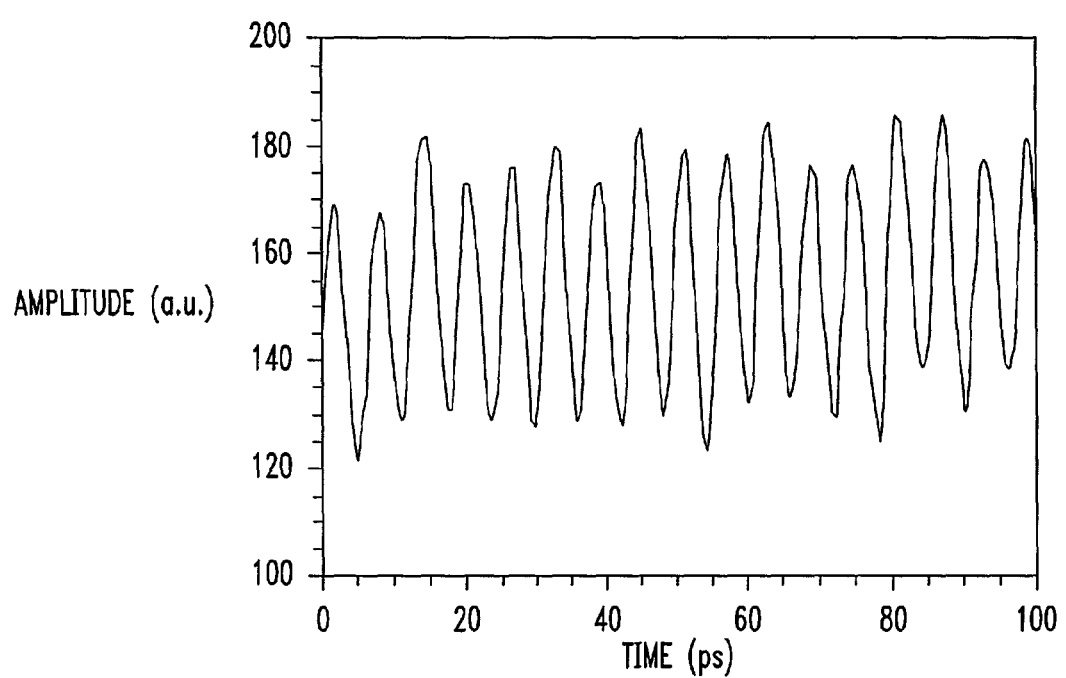
FIG. 3(a) is a streak camera graph of an optical time division multiplexed 160 Gbit/s data stream.
Figure 3B:
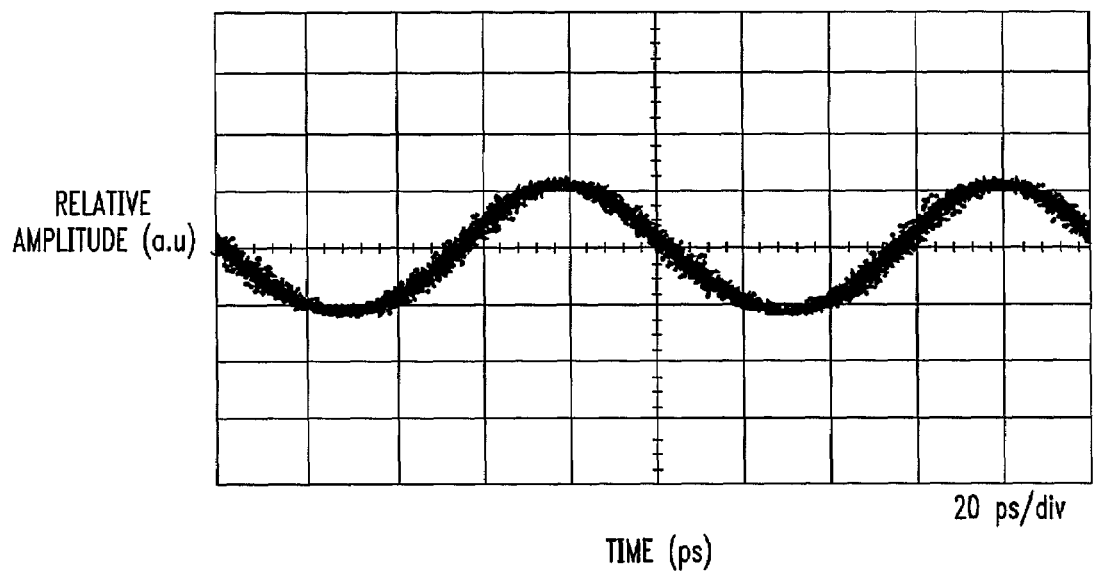
FIG. 3(b) is an oscilloscope trace of a recovered clock signal.
Figure 3C:
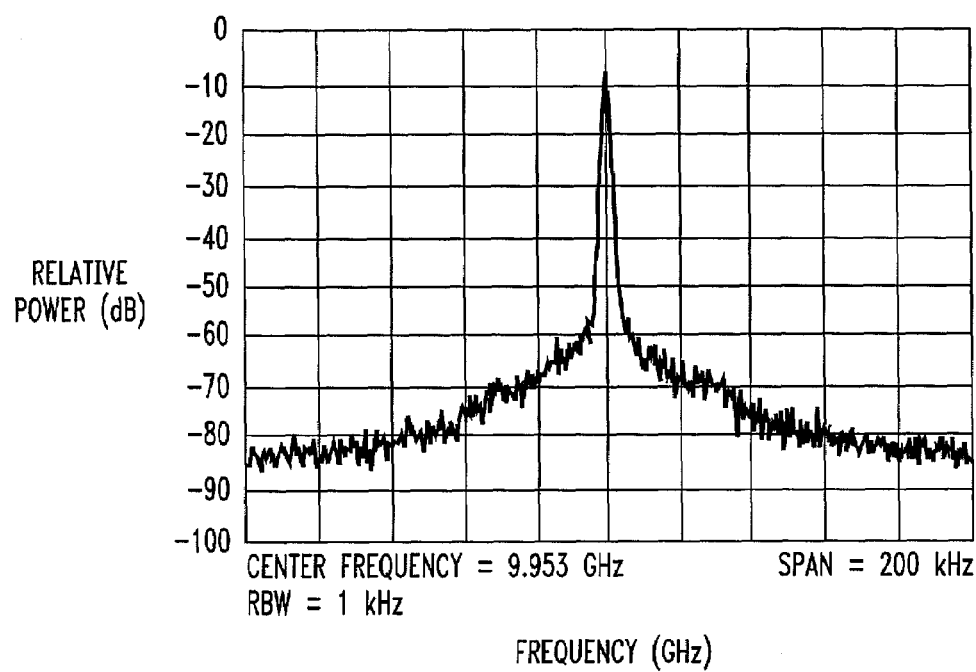
FIG. 3(c) is a graph of the frequency spectrum of a recovered clock signal.

Clock recovery was first performed with an input optical power of −2.0 dBm. When the phases of the driving signals to the concatenated EA modulators 30*a*, 30*b* were appropriately adjusted through the PLL circuitry of circuit 10, the optimized switching window was approximately 4 ps with a suppression ratio of better than 23 dB. FIGS. 3(b) and 3(c) show the oscilloscope trace and the RF spectrum, respectively, of the corresponding recovered clock signal at approximately 10 GHz. The carrier-to-noise ratio (CNR) at a 10 kHz offset was measured to be −87 dBc/Hz. Integrating the noise pedestal resulted in an excellent rms timing jitter of approximately 214 femto seconds (fs).

Figure 3D:
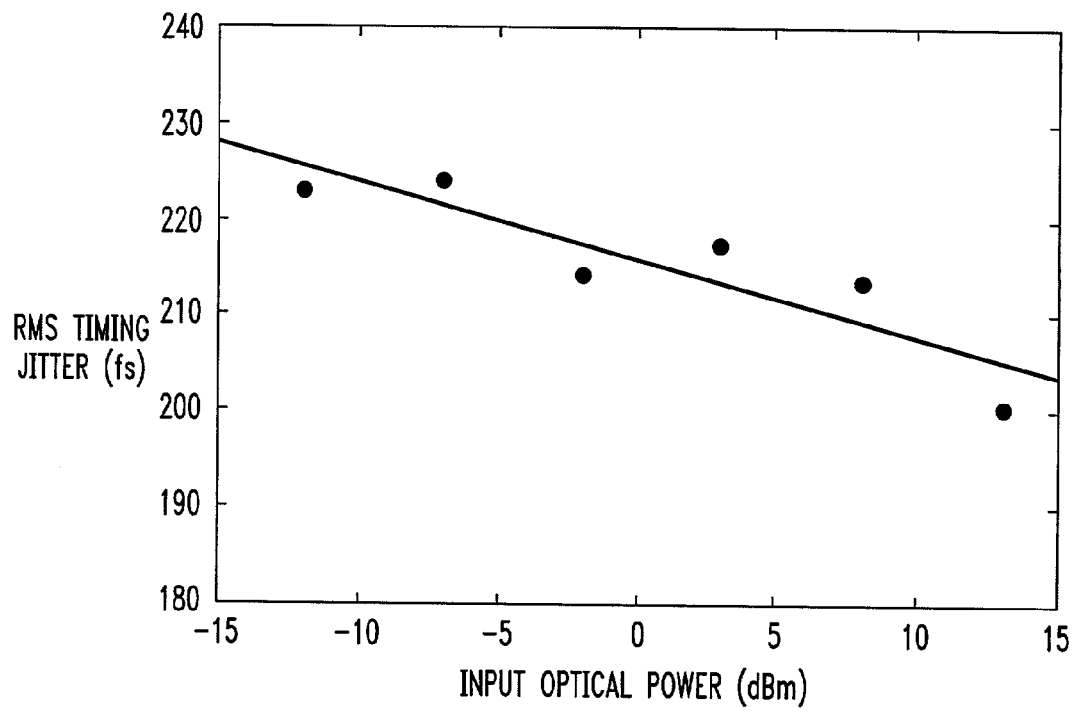
FIG. 3(d) is a timing jitter graph of a recovered clock signal measured as a function of input optical power.

FIG. 3(d) is a graph illustrating the timing jitter of the recovered clock measured as a function of input optical power to the clock recovery circuit 10. When the input optical power decreased from approximately +13 to −12 dBm (a span of 25 dBm), the timing jitter increased approximately monotonically but stayed below 230 fs over the entire range. The recovered clock signal also exhibited excellent phase stability with no measurable drift over the entire 25 dBm range. Such a large dynamic range for the clock recovery circuit 10 may likely be attributed to the use of erbium-doped fiber amplifiers 36a, 36b in the EA modulator circuit 14. The EDFAs operate in the saturated regime for most of the tested range and therefore compensate for variations in input power. Changing the input optical power does affect in-band amplified simulated emission (ASE) noise at the EDFA's output and hence the timing jitter of the recovered clock.

Figure 3E:
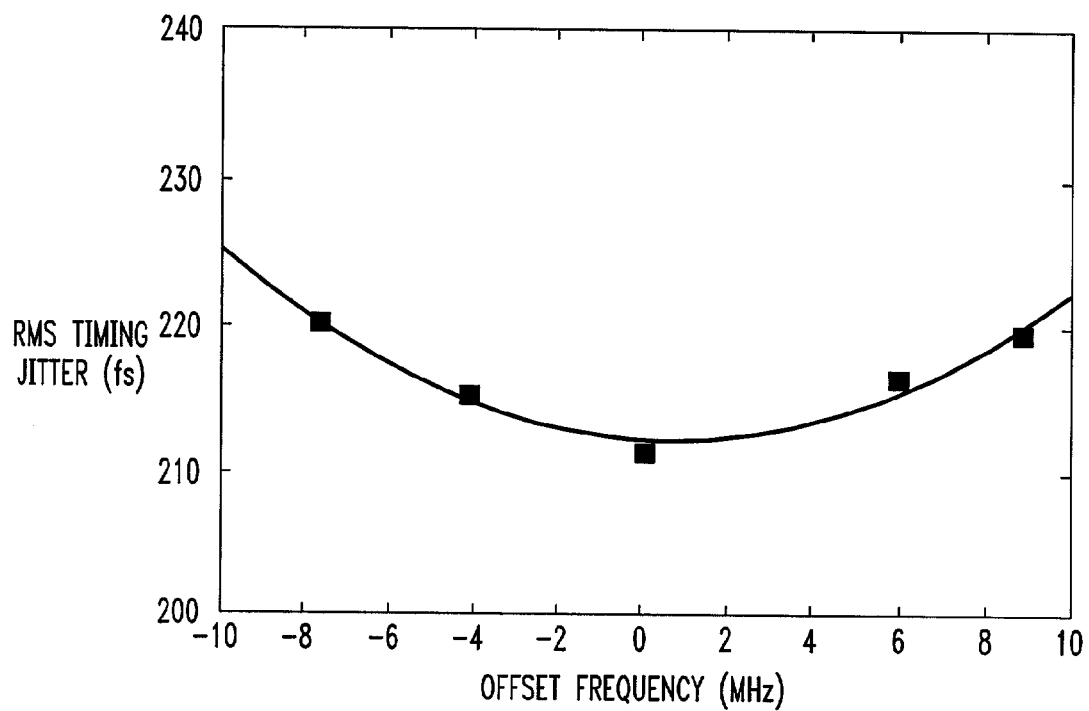
FIG. 3(e) is a graph illustrating the measured timing jitter of a recovered clock signal against frequency of the voltage controlled oscillator.

FIG. 3(e) shows the measured timing jitter as the frequency of the VCO is detuned from the intended clock frequency. The input optical power to the recovery circuit 10 for this measurement was set at −2.0 dBm. The timing jitter is at its minimum when the VCO frequency is set closest to the intended clock frequency and increases when the VCO frequency is detuned in either direction. The hold range of the recovery circuit 10 over this range is approximately ±8 MHZ.

It should be understood from the above that a highly robust electroabsorption modulator based clock recovery circuit is achieved. For an input OTDM 160 Gbit/s signal having tributary rate of 10 GHz, the above-described circuit and method maintain a low rms timing jitter less than 230 fs over a 25 dB range of input optical power and exhibits a frequency detune of approximately ±8 MHZ. Such a circuit approach provides a scalable means for clock recovery for higher and lower OTDM rates, simply by selecting an appropriate VCO frequency value of approximately tributary rate and concatenating sufficient EA modulators within EA modulator circuit 14 to provide a sufficiently narrow switching window to appropriately sample the input OTDM signal. Still further, no dither signal is needed in the PLL, and the recovered clock, therefore, is free of frequency modulation and overly complex circuitry.

Additionally, the clock recovery circuit synchronizes a local clock signal with an incoming optical data signal while the bandwidth of the sampler, photodetector, and microwave mixer need only match the speed of the local clock signal (and not the incoming data rate). In addition, the clock recovery circuit removes the DC level of the error signal in order to detect the polarity of the phase difference between the clock signal and the optical data signal.

Although the sampling circuit is described as an EA modulator circuit, the sampling circuit may be embodied as a non-linear fiber loop mirror or a Mach-Zender add/drop switch, for example.

The clock recovery circuit 10 may be utilized within a node of an optical transmission system. The node may be coupled through an optical transmission line, such as a fiber optic line, to a light source, such as a laser source, which provides an OTDM signal.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A dock recovery circuit for synchronizing a clock signal having frequency of approximately f0 with an optical data signal having a frequency of N×f0, where N is an arbitrary rational number, comprising:
   a local oscillator for generating said clock signal;
   a sampler for producing an output signal indicative of a phase difference between said clock signal and said optical data signal;
   an optical detector coupled to detect said output signal as an electrical signal; and
   a mixer for isolating at least one harmonic of said electrical signal and for downconverting said at least one harmonic to a baseband error signal,
   wherein said local oscillator is tuned in response to said baseband error signal to synchronize said clock signal with said optical data signal.

2. The circuit of claim 1:
   wherein said electrical signal includes a phase error component centered at approximately f0, and
   wherein said mixer mixes said phase error component with said clock signal to produce said baseband error signal.

3. The circuit of claim 2, further comprising a low pass filter coupled between an output of said mixer and an input of said local oscillator for extracting a low frequency component from said baseband error signal for timing said local oscillator.

4. The circuit of claim 1, wherein said sampler includes an electroabsorption modulator.

5. The circuit of claim 4, wherein said sampler further comprises at least one optical amplifier.

6. The circuit of claim 1, wherein said sampler includes a plurality of concatenated electroabsorption modulators coupled to produce a switching window sufficiently narrow for sampling said optical data signal.

7. The circuit of claim 6, wherein said sampler further comprises at least one optical amplifier.

8. The circuit of claim 7, wherein at least one of said plurality of concatenated electroabsorption modulators are monolithically integrated with said at least one optical amplifier.

9. The circuit of claim 1, wherein said optical detector operates at a frequency that is approximately equal to the frequency of said clock signal.

10. A method of synchronizing a clock signal having frequency of approximately f0 with an optical data signal having a frequency of N×f0, where N is an arbitrary rational number, comprising the steps of:
   generating said clock signal with a local oscillator;
   sampling said optical data signal to produce an output signal indicative of a phase difference between said clock signal and said optical data signal;
   detecting said output signal as an electrical signal;
   isolating at least one harmonic of said electrical signal;
   downconverting said at least one harmonic signal to a baseband error signal, and tuning said local oscillator with said baseband error signal to synchronize said clock signal with said optical data signal.

11. The method of claim 10:
wherein said electrical signal includes a phase error component centered at approximately f0, and
wherein said isolating and downconverting steps are performed by a mixer that mixes said phase error component with said clock signal to produce said baseband error signal.

12. The method of claim 11, further comprising the step of extracting a low frequency component from said baseband error signal for tuning said local oscillator.

13. The method of claim 10, wherein said sampling step is performed by an electro-absorption modulator.

14. The method of claim 10, wherein said sampling step is performed by a plurality of concatenated electroabsorption modulators coupled to produce a switching window sufficiently narrow for sampling said input optical data signal.

15. The method of claim 14, wherein said sampling step includes the step of amplifying said output signal with at least one optical amplifier.

16. The method of claim 10, wherein said detecting step is performed by a photodetector operating at a frequency that is approximately equal to the frequency of said clock signal.

17. An optical transmission system adapted to receive a time division multiplexed optical data signal from a light source, said time division multiplexed optical data signal having a frequency of N×f0, where N is an arbitrary rational number and f0 is a tributary rate of component signals in said time division multiplexed optical data signal, said system comprising:
at least one node comprising a clock recovery circuit for synchronizing a clock signal having frequency of approximately f0 wit said time division multiplexed optical data signal, said clock recovery circuit comprising:
a local oscillator for generating said clock signal;
an electroabsorption modulator circuit for producing an output signal indicative of a phase difference between said clock signal and said optical data signal;
an optical detector coupled to detect said output signal as an electrical signal; and
a mixer for isolating at least one harmonic of said electrical signal end for downconverting said at least one harmonic to a baseband error signal,
wherein said local oscillator is tuned in response to said baseband error signal to synchronize said clock signal with said data signal.

18. The system of claim 17:
wherein said electrical signal includes a phase error component centered at approximately f0, and
wherein said mixer mixes said phase error component with said clock signal to produce said baseband error signal.

19. The system of claim 17, wherein said clock recovery circuit further comprises a low pass filter coupled between an output of said mixer and an input of said local oscillator for extracting a low frequency component from said baseband error signal for tuning said local oscillator.

20. The system of claim 17, wherein said electroabsorption modulator circuit comprises a plurality of concatenated electroabsorption modulators coupled to produce a switching window sufficiently narrow for sampling said data signal.

21. The system of claim 20, wherein said electroabsorption modulator circuit further comprises at least one optical amplifier for compensating for insertion losses in said plurality of concatenated electroabsorption modulators.

22. The system of claim 21, wherein at least one of said plurality of concatenated electroabsorption modulators is monolithically integrated with said at least one optical amplifier.

23. The system of claim 17, wherein said electroabsorption modulator circuit further comprises at least one optical amplifier for compensating for insertion losses in said electroabsorption modulator circuit.

24. The system of claim 17, wherein said optical detector operates at a frequency that is approximately equal to the frequency of said clock signal.

* * * * *